United States Patent Office 3,451,992
Patented June 24, 1969

3,451,992
PURIFICATION OF STREPTOMYCIN
Urs Felix Nager, Princeton, and Friedrich Dursch, Freehold, N.J., assignors to E. R. Squibb & Sons Inc., New York, N.Y., a corporation of Delaware
No Drawing. Filed Mar. 24, 1966, Ser. No. 537,004
Int. Cl. C07c 129/18
U.S. Cl. 260—210    4 Claims

ABSTRACT OF THE DISCLOSURE

This invention relates to an improved process for the purification of streptomycin which features a particular combination of steps that may be carried out on one bed of ion exchange material and avoids the losses experienced when repeated transfers are involved. This process comprises adsorbing the fermentation broth on a bed of weakly acidic carboxylic acid cation exchange resin, washing the streptomycin containing resin with carbonic acid, eluting the streptomycin from the resin with moderately concentrated mineral acid solution at a slow linear flow rate and recovering the streptomycin from the eluate.

---

Streptomycin is usually produced by microbiological synthesis. The antibiotic must then be isolated from the fermentation broth in which it is produced.

A conventional procedure involves purification of streptomycin by a number of steps, in which the antibiotic is alternately adsorbed on and desorbed from series of ion exchange columns and is passed as a solution through further ion exchange columns (e.g., deashing column, neutralization column, etc.) to effect removal of various impurities. Such processing requires a considerable capital investment for the numerous ion exchange columns and their auxiliary tankage and piping. Moreover, repeated transfers of the streptomycin from one column to the next in such a procedure results in unavoidable material losses and poor economy.

It has now been found that a particular combination of treatments will effect the purification of streptomycin in a single column, thus drastically reducing equipment requirements. All operations are carried out on one bed of ion exchange material without transferring the streptomycin from one column to another with its concomitant losses. Thus, improved streptomycin yields are realized.

In accordance with the process of this invention, the whole fermentation broth containing the streptomycin formed by the microorganism is first transferred to a column containing a bed of weakly acidic cation exchange resin in a salt form, e.g., the sodium form. In this operation, a spent broth is removed containing mycelium and neutral and acidic impurities. The resin at this point essentially contains streptomycin, colored impurities, as well as inorganic impurities consisting mostly of heavy metal ions (e.g., copper, lead), alkaline earth metal ions (e.g., calcium, magnesium) and alkali metal ions (e.g., sodium).

Then, according to this invention, this resin bed is now washed with an aqueous solution of a chelating agent, e.g., by a single pass of the solution through the column or by a recirculating stream. This step effects the removal of the inorganic impurities except for the alkali metal ions. All other metal cations are exchanged for the cations of the chelating agent, e.g., sodium ion. At this point, the resin bed holds essentially streptomycin, colored impurities and alkali metal ions.

Next the resin bed is washed with an aqueous solution of carbonic acid, e.g., by filling the column with water and introducing gaseous carbon dioxide, preferably under slight pressure, and continuing this wash until all the alkali metal ions are substantially removed from the column and are replaced by hydrogen ions. No streptomycin is lost in this operation, carbonic acid being selective in the replacement of alkali metal ions. At this point, essentially streptomycin and colored impurities are left on the resin bed. The ash content is very low.

The final step, according to this invention, is a controlled elution of the resin bed with a moderately concentrated acid solution, using a slow linear flow rate. This elutes the streptomycin in the form of the acid salt corresponding to the anion of the acid used for this purpose. An aqueous streptomycin salt solution is obtained substantially pure and requiring only the conventional finishing steps, e.g., decolorization with activated carbon, concentration and lyophilization. The streptomycin, which is acid sensitive, is not subjected to a low pH environment in this controlled elution step.

The cation exchange resin forming the bed in the adsorption column is a weakly acidic, carboxylic acid cation exchange resin. A carboxylic acid resin of the methacrylate/styrene/divinylbenzene type (e.g., Amberlite IRC–50) is preferred but other suitable resins may be employed (e.g., the acrylate based Amberlite XE–222). The resin is in the sodium form at the beginning of the cycle and it may be regenerated with sodium hydroxide at the conclusion of the complete operation. The resin is maintained as a bed, filling about 50 to 80% of the column in the sodium cycle, and is in a physical form that permits percolation by the fluid treating agents and their removal as effluents. The treating agents are preferably introduced through distributing devices, such as spargers, at the top or the bottom of the column.

The first treatment may be effected with any chelating agent of the amino acid type, e.g., ethylenediamine tetraacetic acid, nitriolotriacetic acid, or the like. Ethylenediamine tetraacetic acid is preferred and is used as an aqueous solution containing about 10% by weight, adjusted to a pH of about 8 with sodium hydroxide. The total amount of chelating agent required depends somewhat on the impurities of the fermentation broth and may be determined by appropriate titration of a sample. Washing with the chelating agent is continued for about two hours or until no further increase of metal ion concentration excepting alkali metal ions can be found in the recycle liquid by complexometric titration.

The carbonic acid treatment is effected, as indicated, by simultaneously introducing gaseous carbon dioxide and water into the column. Alternately, a solution of carbon dioxide in water may be prepared separately before piping to the resin column. A column head pressure of 15 to 30 p.s.i. abs. is preferred. The carbonic acid treatment is continued until alkali metal ions have been substantially removed from the column as indicated by a drop of sodium ion concentration in the effluent stream, determined for example by an appropriate sodium sensitive glass electrode or by flame photometry.

Sulfuric acid is the preferred acid for the final step of controlled elution of the streptomycin from the resin bed. The antibiotic is thus obtained in the form of streptomycin sulfate, the stable form commonly preferred in general use. Any other strong mineral acid, e.g., nitric acid, phosphoric acid, and the like, may, however, be used. Moderately concentrated acid solutions, about normal to five normal in acidity, are used for the controlled elution. This operation is continued at a low linear flow rate until the pH of the pooled rich eluate has dropped to about 5.0 to 5.5. The effluent is now ready for the conventional finishing treatment, e.g., decolorization and lyophilization.

According to the preferred mode of operation, a conventional vertical column of about 500 gallon capacity and containing inlets and outlets at top and bottom, respectively, for introduction and removal of fluids, is charged with a bed of a commercial carboxylic acid cation exchange resin (Amberlite IRC-50) suitably supported on a screen near the bottom. About 300 gallons of this resin in the sodium form are placed in the column. Whole fermentation broth taken directly from the fermenter and diluted about 1:1 with either fresh water or with spent carbonic acid wash from a previous treating cycle is adsorbed on the resin. The whole broth is run through the column until streptomycin levels in inflow and outflow are substantially equal and until about 270 billion units of streptomycin have been adsorbed.

About 300 gallons of a solution of ethylenediamine tetraacetic acid, containing about 100 grams per liter (adjusted to a pH of about 8.1), are introduced through a sparger at the top of the column. A rate of about 10 gallons per minute maintained under a head of 10 p.s.i. has been found to be satisfactory although somewhat higher or lower rates may also be used. The solution is circulated through the resin and continuously recycled until no further increase of chelated metal concentration is found, usually for about two hours. The spent solution is subsequently removed and passed to a chelating agent recovery unit.

Upon completion of the treatment with the chelating agent, the carbonic acid treatment is initiated. The column is filled with water by backwashing and carbon dioxide is then admitted under pressure until a head pressure of about 15 p.s.i. has built up. Then fresh water is continuously introduced through the top sparger along with sufficient carbon dioxide to effect saturation of the water entering the column. A flow rate of about 15 gallons per minute of liquid has been found satisfactory and is maintained by appropriate adjustments of inflow and drawoff. A treatment period of about seven hours for the size of the bed described above is usually sufficient but this may be varied by adjusting the flow rates and the head pressure. The spent carbonic acid solution may be collected for subsequent use in diluting whole broth as mentioned previously. The carbonic acid wash is terminated when sodium concentration of the effluent has decreased to less than 10% of its peak value as determined by a sodium sensitive glass electrode.

Upon completion of the carbonic acid wash the column bed is now eluted with moderately concentrated sulfuric acid, e.g., about 5 to 25% w./v. This acid is fed through the top sparger at a flow rate not exceeding about 5 gallons per minute. The effluent is pooled and the acid elution is continued until the pH of the pool has dropped to about 5.0 to 5.5.

This acid eluate contains streptomycin sulfate in concentrations of about 350 million units per gallon and requires only conventional final workup, e.g., carbon decolorization and vacuum concentration or lyophilization.

What is claimed is:

1. A process for the purification of streptomycin from fermentation broth which comprises adsorbing whole fermentation broth on a bed of a weakly acidic carboxylic acid cation exchange resin, in sequence (1) washing streptomycin containing resin with an amino acid type chelating agent, (2) treating the resin with carbonic acid, the streptomycin remaining on the resin through steps (1) and (2) without removal, (3) eluting the streptomycin from the resin with moderately concentrated mineral acid solution, at a slow linear flow rate and (4) recovering the streptomycin from the eluate.

2. A process as in claim 1 wherein the chelating agent is ethylenediamine tetraacetic acid and the acid is sulfuric acid.

3. A process as in claim 2 wherein the cation exchange resin is a cross linked copolymer of acrylic or methacrylic acid.

4. A process for the purification of streptomycin which comprises adsorbing whole streptomycin fermentation broth on a bed of a weakly acidic carboxylic acid cation exchange resin in a fixed bed column, washing said bed with about one bed volume of a recirculating aqueous solution of ethylenediamine tetraacetic acid sodium salt for about one to three hours, without removing the adsorbed streptomycin, treating said bed with carbonic acid at a rate of about one to five bed volumes per hour under a pressure of about 5 to 50 p.s.i. for a period of about 3 to 10 hours, eluting the streptomycin from the ion exchange resin with moderately concentrated sulfuric acid until the pH of the pooled effluent drops to about 5, and isolating streptomycin sufate from the eluate.

References Cited

UNITED STATES PATENTS

| 2,528,022 | 10/1950 | Van Dolah et al. | 167—65 |
| 2,765,302 | 10/1956 | Bartels et al. | 260—210 |
| 2,827,417 | 3/1958 | Friedman et al. | 167—65 |

ALBERT T. MEYERS, *Primary Examiner.*

DAREN M. STEPHENS, *Assistant Examiner.*

U.S. Cl. X.R.

424—181